Figure 1:
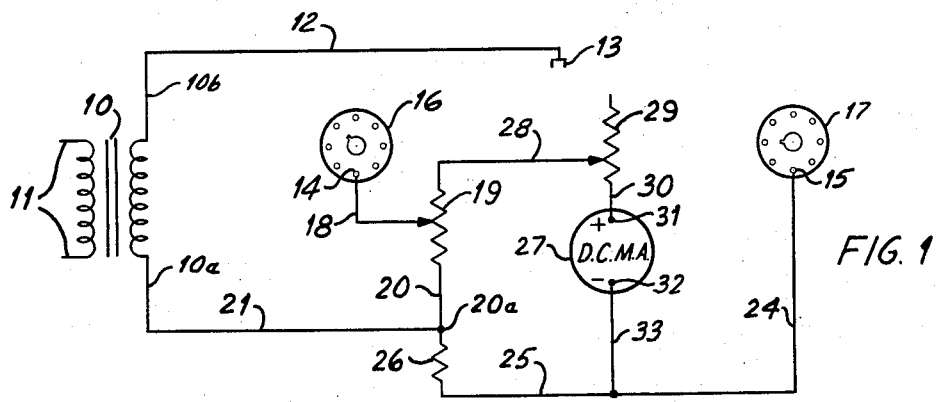

Aug. 25, 1959          D. LOSSEF          2,901,690

INTERCHANGEABLE TUBE CAP CIRCUIT

Filed Dec. 26, 1957

*INVENTOR.*
*DAVID LOSSEF*
BY Edward Halle
*ATTORNEY*

United States Patent Office 2,901,690
Patented Aug. 25, 1959

2,901,690

INTERCHANGEABLE TUBE CAP CIRCUIT

David Lossef, New York, N.Y.

Application December 26, 1957, Serial No. 705,224

4 Claims. (Cl. 324—22)

My invention consists of a novel circuit for use in a testing device for vacuum tubes having a "tube cap" connector to one or more of the components of the tube.

It is well known that certain characteristics of vacuum tubes can be tested by applying voltages of proper magnitude so that electrons flow from the cathode to the anode of the tube, and then measuring this flow on a direct current ammeter. For purposes of describing my invention, the terms anode, plate and grid are synonymous, since I may use the plate or the grid or any combination of these elements for the anode. The meter reading then indicates whether or not the tube still is serviceable.

There are many types of tube cap vacuum tubes, some of which have the plate (anode) connected to the tube cap, such as the 1B3 half-wave vacuum rectifier, and others with the cathode connected to the tube cap, such as the 6V3 half-wave vacuum rectifier. If the same testing circuit, having a single tube cap lead, is used on both types of tubes, it will cause the direct current ammeter to deflect in different directions when testing each of the mentioned tubes. In testing the 1B3 tube with the plate-connected (anode) tube cap, the electrons will flow toward the plate electrode (anode) toward the tube cap connection of the circuit. In testing the 6V3 cathode-connected tube cap, the electrons will again flow toward the plate (anode) but in this case away from the tube cap connection.

In order to build a tester which would compensate for the reversal of electron flow and in which the ammeter needle would always swing in the same direction during testing it has been necessary in the past to provide more than one tube cap connection or a separate switch in the device. This has resulted in a necessary duplication of the wiring in the testing device, and also in necessitating two separate tube cap connectors or additional components. This not only increases the cost of the device but provides more parts to get out of order.

Further, it is most undesirable to have separate tube cap connectors when the tube tester is to be used as a "do it yourself" device in self-service stores where the customer will test his own tubes. It is confusing to the customer to have to determine which of two tube caps to place on his tube. It is even more confusing to the average customer to be required to select a switching position.

It is therefore the main object of my invention to provide a circuit, or electrical network, which will permit one tube cap connector to be used universally on any tube cap tube, whether it be anode (plate or grid) or cathode-connected, without the use of any switching mechanism.

It is also an object of my invention to provide a tube tester which is more economical to manufacture and easier to maintain.

I accomplish these objects by the invention illustrated in the accompanying diagrams, in which—

Fig. 1 is a circuit drawing of my invention with no vacuum tube inserted.

Figure 2:
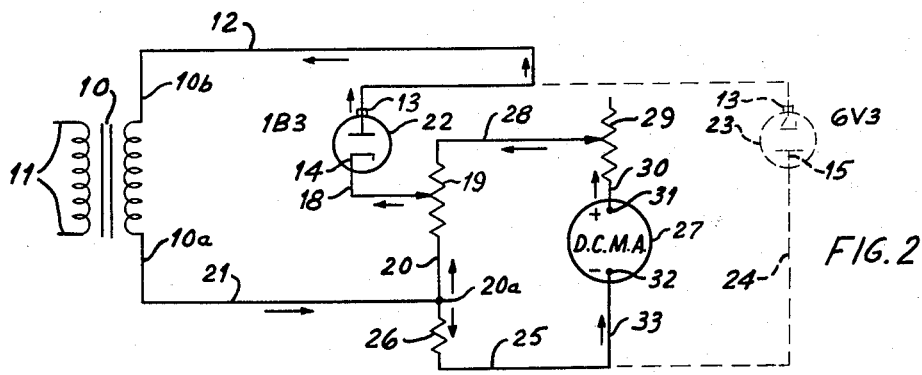
Figure 3:
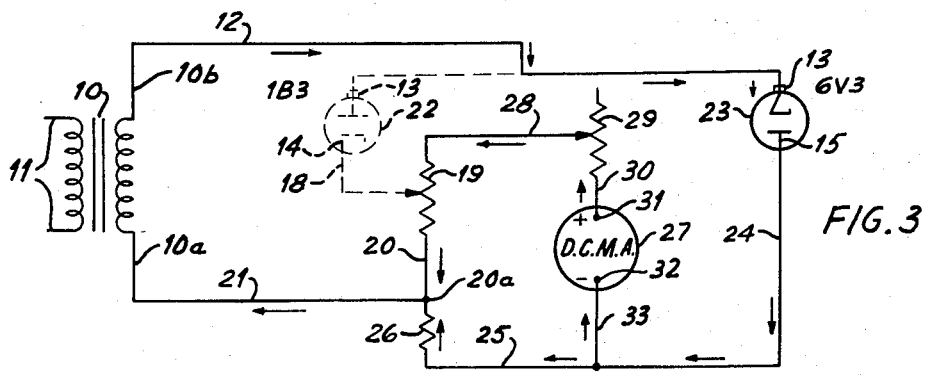

Fig. 2 is a circuit drawing of my invention showing the circuit which results in the electrical network when a vacuum tube with a plate-connected (anode) tube cap is connected (the balance of the circuit normally for the cathode-connected tube cap vacuum tube being shown in dotted lines); and Fig. 3 is a circuit diagram showing a cathode-connected tube cap vacuum tube inserted in the device (and showing the plate-connected (anode) tube cap portion of the device in dotted lines).

Similar numerals refer to similar parts throughout the several views.

Power for the circuit is supplied by a transformer 10 which operates on 110–120 volt alternating current through input lines 11. I illustrate the invention with this type of power supply as being the most common. However, any type of alternating current power supply may be used.

There are two vacuum tube pin connectors 14 and 15 shown in separate vacuum tube sockets 16 and 17. A line 18 connects the pin connector 14 to a resistance means 19. The resistance means may be a variable resistance such as a potentiometer, and the connection is made from the pin connector 14 to the arm of the potentiometer 19. The resistance means such as the potentiometer 19 is connected by means of a line 20 through a junction point 20a thence through a line 21 to an end 10a of the secondary winding of the transformer 10. A line 12 connects the other end 10b of the secondary winding of the transformer 10 to a tube cap connector 13.

The ends 10a and 10b of the secondary of the transformer 10 are designated as sides of the power supply. For example, the end 10a may be designated as a first side and the end 10b as a second side of the A.C. power supply. These same designations may apply to the sides of any type of A.C. power supply.

When a vacuum tube is inserted into the device so that a cathode-connected pin makes contact with the pin connector 14 and the tube cap 13 makes contact with the tube cap of the tube (anode), a circuit is completed between the transformer 10 running through line 12 and the mentioned vacuum tube 22 line 18, the potentiometer 19, and lines 20 and 21. This circuit also includes a milliammeter 27, which will be more particularly mentioned hereinbelow.

When the vacuum tube 22 is removed and a vacuum tube 23 is placed in connection with the device, a new circuit, which includes elements of the first mentioned circuit, is set up running from the secondary of the transformer 10 through line 12 to the tube cap 13, through the tube 23 through a line 24 and line 25 which connects the pin connector 15 to resistance means such as the resistor 26, then through the junction point 20a and then through line 21 to the other end of the secondary of the transformer 10, completing the circuit. This new circuit also incorporates the milliammeter 27.

Thus, when the power is connected to the primary of the transformer 10, a circuit is completed merely by inserting a proper vacuum tube in one of the sockets 16 or 17 and connecting the tube cap 13 to the tube. For testing a tube with a plate-connected (anode) tube cap, such as the 1B3 tube, the tube is inserted in the socket 16, and when testing a tube having a cathode-connected tube cap such as the 6V3 tube, the tube is inserted in the socket 17 and the cap 13 is connected to the tube cap of the respective tube.

For testing purposes, I have interposed a milliammeter 27. It is connected to the potentiometer 19 through a line 28, a resistance means, which may be a variable resistance such as a potentiometer 29 and a line 30. This connection is made to the positive connector 31 of the milliammeter 27. The negative connector 32 of the milliammeter 27 is connected to the line 25 by means of a line 33. By connecting the milliammeter 27 in this fashion, it is always parallel with the circuit part of my device that is in use in accordance with the following explanation:

The principle used in the tube testing device in which my circuit is comprised, is that of electron emission from the cathode to the anode of a tube. All tubes are therefore tested as rectifiers. The anode may be the plate electrode, or the grid electrode, or any combination of grids and/or plates. The use of this system necessarily converts the alternating current which comes out of the output of the transformer to direct current at that portion of the circuit where it flows through the milliammeter 27.

The electrons will flow only from the cathode to the anode, since the tube being tested acts as a rectifier and permits current to flow in only one direction. I have indicated the electron flow for a plate-connected (anode) tube cap tube on Fig. 2 of the drawings, by means of arrows. I have also indicated by arrows the direction of the electron flow for a cathode-connected tube cap on Fig. 3 of the drawings. Although the flow of electrons in Fig. 2 is opposite to the flow of electrons in Fig. 3, the milliammeter 27 is so connected in the entire circuit that no matter which way the electron flow goes it always goes through the milliammeter 27 in the same direction; that is, from the negative connector 32 to the positive connector 31. Because of this effect, the needle of the milliammeter 27 will always deflect in the same direction no matter what type of tube is being tested in the device. Thus, my device will test either anode-connected or cathode-connected tube cap tubes by means of the use of a single tube cap connector 13 and a single milliammeter 27, and the needle will always move in the same direction regardless of which type of tube is being tested.

While I have described my invention in its preferred form, there are other forms which it might take coming within the scope of the claims below, and I desire to be protected for all forms coming within the mentioned forms.

It is also necessary to provide the proper heater or filament voltages for the tube to be tested in tube sockets 16, 17. I have not shown or described the portions of the tube testing device for this purpose since this is well known to the art and any type of transformer or other power supply means may be used, so long as the proper voltages are supplied to meet the requirements of the tube to be tested.

Wherefore, I claim:

1. A tube testing device comprising in combination: an interchangeable tube cap connector, an alternating current power supply comprising a first side and a second side, a direct current indicating device having a positive connector and a negative connector, at least one tube socket comprising at least one tube pin connector adapted to be contacted to at least one cathode connected pin of a tube, at least one tube socket comprising at least one tube pin connector adapted to be contacted to at least one anode connected pin of a tube, resistance means, and an electrical network; in which the first side of the alternating current power supply is connected through a junction point respectively; to at least one cathode pin connection of a first mentioned tube socket through resistance means and to at least one anode pin connection of a second mentioned tube socket through resistance means; the second side of the alternating current power supply being connected by a conductor to the tube cap connector; the cathode pin connection of the first mentioned tube socket being connected to the positive connector of the direct current indicating device through resistance means; and the negative connector of the direct current indicating device being connected to the anode pin connector of the second mentioned tube socket; whereby, when a tube with a tube cap connected to an anode element in the said tube is inserted in a said first mentioned tube socket and the said tube cap connector is connected to the cap of said tube, a circuit will be closed causing an electron flow to travel from the negative connector of the direct current indicating device toward the positive connector of the said direct current indicating device; and when a tube with a tube cap connected to a cathode element in the tube is inserted in a second mentioned tube socket and the said tube cap connector is connected to the cap of the said tube, a circuit will be closed causing an electron flow to travel from the negative connector of the direct current indicating device toward the positive connector of the said direct current indicating device.

2. The device, as defined in claim 1, in which at least one of the said resistance means is a variable resistor.

3. A tube testing device comprising in combination: an interchangeable tube cap connector, an alternating current power supply comprising a first side and a second side, a direct current indicating device having a positive connector and a negative connector, at least one tube socket comprising at least one tube pin connector adapted to be contacted to at least one cathode connected pin of a tube, at least one tube socket comprising at least one tube pin connector adapted to be contacted to at least one anode connected pin of a tube, resistance means, and an electrical network; in which the first side of the alternating current power supply is connected through an intermediate portion of the resistance means to at least one cathode pin connection of the first mentioned tube socket, and through an end portion of the resistance means through a junction point, respectively, to at least one anode pin connection of a second mentioned tube socket and to the negative connector of the direct current indicating device, the positive connector of the direct current indicator device being connected to the end portion of the resistance means opposite the first mentioned end portion, the second side of the alternating current power supply being connected by a conductor to the tube cap connector; whereby when the tube with a tube cap connected to an anode element in the said tube is inserted in a said first mentioned tube socket and the said tube cap connector is connected to the cap of said tube, a circuit will be closed causing an electron flow to travel from the negative connector of the direct current indicating device toward the positive connector of the said direct current indicating device; and when a tube with a tube cap connected to a cathode element in the tube is inserted in a second mentioned tube socket and the said tube cap connection is connected to the cap of the said tube, a circuit will be closed causing an electron flow to travel from the negative connector of the direct current indicating device toward the positive connector of the said direct current indicating device.

4. The device, as defined in claim 3, in which at least one portion of the resistance means is a variable resistance.

References Cited in the file of this patent
UNITED STATES PATENTS

| | | |
|---|---|---|
| 1,963,208 | Miller | June 19, 1934 |
| 2,795,755 | Anthes et al. | June 11, 1957 |

OTHER REFERENCES

Scott: "Radio-Electronics," March 1956, pp. 81–84.